Aug. 12, 1941.  B. F. GIFFORD  2,252,426

DEVICE FOR LOCATING THE OCCLUSAL PLANE

Filed Dec. 22, 1939

INVENTOR
Ben F. Gifford
BY
Thos. E. Scofield
ATTORNEY

Patented Aug. 12, 1941

2,252,426

UNITED STATES PATENT OFFICE 2,252,426

DEVICE FOR LOCATING THE OCCLUSAL PLANE

Ben F. Gifford, St. Joseph, Mo.

Application December 22, 1939, Serial No. 310,606

3 Claims. (Cl. 32—19)

My invention relates to a device for locating the occlusal surface in the building of artificial dentures.

One of the most difficult tasks a dental surgeon faces in making restorations is to attain what is known as balanced occlusion. Unless the load on the artificial dentures is evenly distributed, a lateral vector is set up during chewing movements of the mandible, which soon causes the deformation of the alveolar ridge resulting in ill fitting dentures.

Many attempts have been made to provide means for locating the proper occlusal surface in artificial dentures. These, however, have been complicated and not wholly successful, because of the variations in human anatomy. In its last analysis, each set of dentures presents a problem peculiar to the individual by whom they are to be used.

One object of my invention is to provide a simple device for locating the proper occlusal surface in the building of artificial dentures.

Another object of my invention is to provide a simple method of obtaining centric relationship of the upper and lower jaws.

Other and further objects of my invention will appear from the following description.

In the accompanying drawing which forms part of the instant specification and is to be read in conjunction therewith and in which like reference numerals are used to indicate like parts in the various views.

Figure 1:
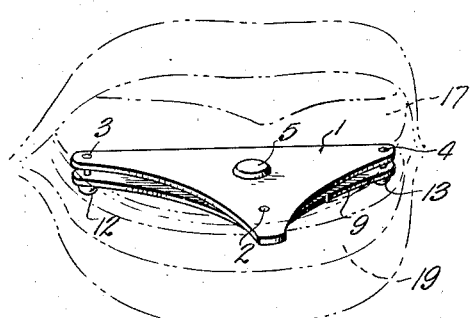
Figure 1 is a perspective view of a device embodying my invention.
Figure 2:
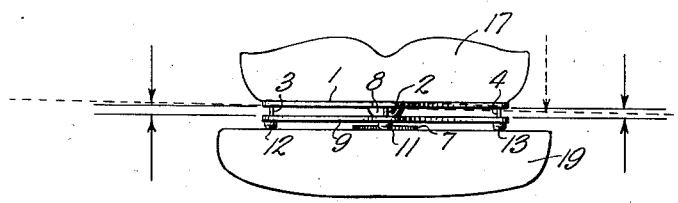
Figure 2 is a front elevation of the device shown in Figure 1.
Figure 3:
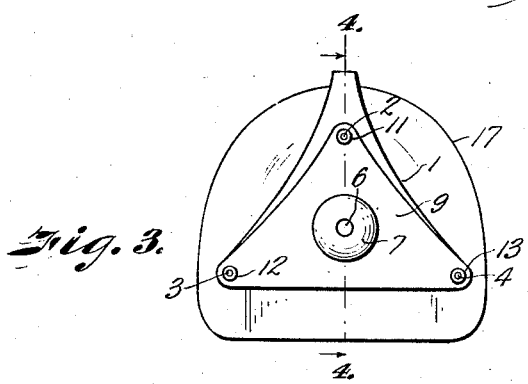
Figure 3 is a bottom plan view of the occlusal plane locater shown in Figure 1.

Referring now to the drawing, my device comprises an upper plate 1 in which are fixed three pins 2, 3, and 4, disposed at the apexes of an isosceles triangle. Centrally located with respect to the pins and secured to plate 1 is a stud 5 projecting downwardly and provided with a threaded portion 6, adapted to receive a nut 7. A bearing member 8 having a spherical bearing surface, is carried by the stud 5. A lower plate 9, having an opening 10 for the passage of the threaded portion of the stud 5, carries three mounted projections 11, 12 and 13. The projections are formed with internal bores through which the respective pins may pass. The opening 10 is formed with a spherical periphery 14, adapted to coact with the bearing member 8. The upper surface 15 of the nut 7 is flat and of considerable area so that, when the surface 15 contacts the lower surface of plate 9, the plate 9 will be located in a position parallel to plate 1.

The stud 5 is located approximately along the median line of the jaw. The pin 2 is located approximately at the contact point of the lower incisors, along the median line, and pins 3 and 4 are located approximately at the center of the lower first molars.

Figure 4:
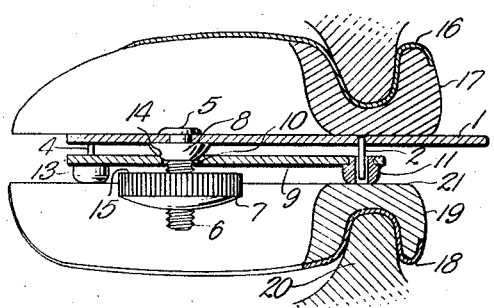
Figure 4 is a sectional view taken on the line 4—4 of Figure 3, showing the occlusal plane locater in position in a conventionalized oral cavity.

In use, an upper denture base 16 supports a modeling compound 17, to which the plate 1 is secured, as can readily be seen by reference to Figure 4, it being understood that any suitable means for holding the upper plate 1 to the denture base may be employed. A lower denture base 18 containing a hard modeling compound block 19 is placed over the lower alveolar ridge 20. The upper or occluding surface 21 of the modeling compound is flattened to approximate the occlusal plane along which the artificial dentures are to contact. The nut 7 is loosened so that the lower plate 9 is free to pivot about the spherical bearing surface of the bearing member 8.

The patient then closes his jaws and exerts pressure, while making lateral and protrusive movements. Any unbalanced pressure, either in a distal-mesial direction or in a buccal-lingual direction, will permit the lower plate 9 to tilt around its spherical bearing with respect to the upper plate 1. The lower plate 2 is supported by the approximate occlusal surface 21 by the three ball points 11, 12 and 13, said ball points 11, 12 and 13 being located so that any pressure exerted on bearing 8 is distributed equally at the three ball points 11, 12 and 13. As the lower plate 9 tilts, a pin or pins will pass downwardly through the openings in the ball points and scratch the modeling compound.

The patient then opens his mouth and the lower denture base is removed and the occlusal plane adjusted by scraping the scored areas with a sharp knife to remove the high points. The lower denture is then replaced and the process repeated until finally an occlusal surface is located on the hard modeling compound which will permit movements of the jaw in both the lateral and protrusive directions, to be made without producing an unbalance which will cause the lower plate 9 to tilt with respect to the upper plate 1. When this is achieved, none of the pins 2, 3 or 4 will be forced downwardly through the openings in the ball points.

After the occlusal plane is thus located, the artificial dentures can be built upon any articular, it being remembered that the grinding surface of the artificial dentures must be located along the occlusal plane, located by means of my device. The height of the modeling compound 19 on the lower denture base is built up to approximately the height which the artificial teeth will eventually occupy.

It will be seen that I have accomplished the objects of my invention. I have provided a device for locating the correct occlusal plane in the building of artificial dentures, which may be used in any mouth and thus enable me to build dentures suited to the individual for whom they are being made, without the necessity of approximating or compromising. The exact occlusal plane best suited for the individual will be located. The plane may be of varying concavity according to the particular anatomy of the individual. If, after the plane has been located, a thin layer of soft wax is painted over the top of the hard modeling compound 21 and the device replaced, it will be found, upon movement of the jaws in closed position, that the ball points 11, 12 and 13 will produce three triangular tracings in the form of a Gothic arch, which is the generally accepted basis for attaining centric occlusion.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A device for locating the occlusal surface in the building of artificial dentures, comprising in combination an upper plate adapted to be supported in a patient's mouth by the upper jaw, a plurality of pins supported by said plate, a lower plate, means for mounting said lower plate for movement with respect to said upper plate around longitudinal and transverse axes, a plurality of bearing members secured to said lower plate, said bearing members being adapted to rest upon the occlusal surface being located, said bearing members being formed with bores, said pins projecting through said bores, the construction being such that, upon the tilting of said lower plate with respect to said upper plate said pins may project through said bores and contact the occlusal surface.

2. A device for locating the occlusal surface in the building of artificial dentures, including in combination an upper plate, three pins carried by said upper plate substantially at the apexes of a triangle, a bearing member located centrally of said pins, said bearing member formed with a spherical bearing surface, a lower plate tiltably supported by said bearing member, three lugs carried by said lower plate, said lugs being formed with bores, said pins being of such length that, upon the tilting of said lower plate with respect to said upper plate, the end of a pin will project through a lug and out of its bore.

3. A device for locating the occlusal surface in the building of artificial dentures, including in combination an upper plate, three pins carried by said upper plate substantially at the apexes of an isosceles triangle, a stud carried by said upper plate centrally of said pins and projecting downwardly, a bearing member carried by said lug and provided with a spherical surface, a lower plate supported by said spherical surface, three lugs carried by said lower plate in juxtaposition with said three pins, said lugs being formed with bores, said pins projecting into said bores, the lower end of said stud being provided with threads, a nut upon said threads, said pins being of such length that, when said lower plate is substantially parallel to said upper plate, none of said pins will project through said bores past the ends of said lugs.

BEN F. GIFFORD.